United States Patent [19]

Aughwane

[11] Patent Number: 4,780,288

[45] Date of Patent: Oct. 25, 1988

[54] SOLVENT EXTRACTION COLUMNS

[75] Inventor: Keith R. Aughwane, Cheshire, England

[73] Assignee: British Nuclear Fuels Plc, Risley, England

[21] Appl. No.: 37,885

[22] Filed: Apr. 13, 1987

[30] Foreign Application Priority Data

May 1, 1986 [GB] United Kingdom ................. 8610672

[51] Int. Cl.⁴ .............................................. B01D 11/00
[52] U.S. Cl. ..................................... 422/257; 210/634
[58] Field of Search ................ 210/634; 422/220, 256, 422/257; 23/293 R

[56] References Cited

U.S. PATENT DOCUMENTS 3,723,072  3/1973  Carson et al. .................. 422/220 X

FOREIGN PATENT DOCUMENTS 563202   9/1958  Canada ............................... 422/256
855963  12/1960  United Kingdom ................ 422/256

*Primary Examiner*—Frank Spear
*Attorney, Agent, or Firm*—William R. Hinds

[57] ABSTRACT

A solvent extraction column (1) includes a distributor (3) for receiving feed liquid introduced into the column through an inlet port (2). The distributor (3) comprises an endless open channel (4) having a plurality of spaced apart apertures (10). The distributor is positioned adjacent the inlet port and feed liquid from the inlet port enters the channel and is distributed through the apertures (10) over the column.

8 Claims, 2 Drawing Sheets

SOLVENT EXTRACTION COLUMNS

The present invention concerns solvent extraction columns.

BACKGROUND OF THE INVENTION

In brief, solvent extraction columns are employed to achieve mass transfer between immiscible phases introduced into the column. For example, in the reprocessing of irradiated nuclear fuel, the fuel is dissolved in acid to provide an aqueous phase which is brought into contact with an appropriate solvent phase in the column to effect preferential extraction of uranium and plutonium from the aqueous phase into the solvent phase whilst leaving fission products in the aqueous phase. For effective operation it is required to ensure effective distribution of the phases in the column. The column, which can be pulsed, can be operated either in a solvent continuous or aqueous continuous mode.

In the solvent continuous mode, an aqueous feed is introduced into an upper region of the column to fall through the less dense solvent phase rising through the column. In the aqueous continuous mode, a solvent feed is introduced into a lower region of the column to rise through the denser aqueous phase filling through the column. As the inlet ports for the aqueous and solvent feeds are positioned in the wall of the column the incoming feed tends to remain in that region of the continuous phase which is adjacent the inlet over the length of the column. Consequently a large proportion of the continuous phase within the column is effectively unused for the mass transfer effect.

It is an aim of the invention to provide a solvent extraction column which is capable of distributing the feed over an increased extent of the column than hitherto.

FEATURES AND ASPECTS OF THE INVENTION

According to the present invention there is provided a solvent extraction column including a distributor for receiving feed liquid introduced into the column through an inlet port in which the distributor comprises an endless axially open channel having inner and outer side walls and dimensioned to fit with radial clearance within the channel at a position adjacent to and axially offset with respect to the inlet port, a plurality of angularly spaced apart apertures in the channel for distributing liquid entering the channel from the inlet port over the extent of the column, the inner side wall of the channel extending across the inlet port to direct incoming flow at the inlet port into the channel.

DESCRIPTION OF THE DRAWINGS

The invention will be described further, by way of example, with reference to the accompanying drawings, in which.

DESCRIPTION OF THE PREFERRED EMBODIMENT

Figure 1:
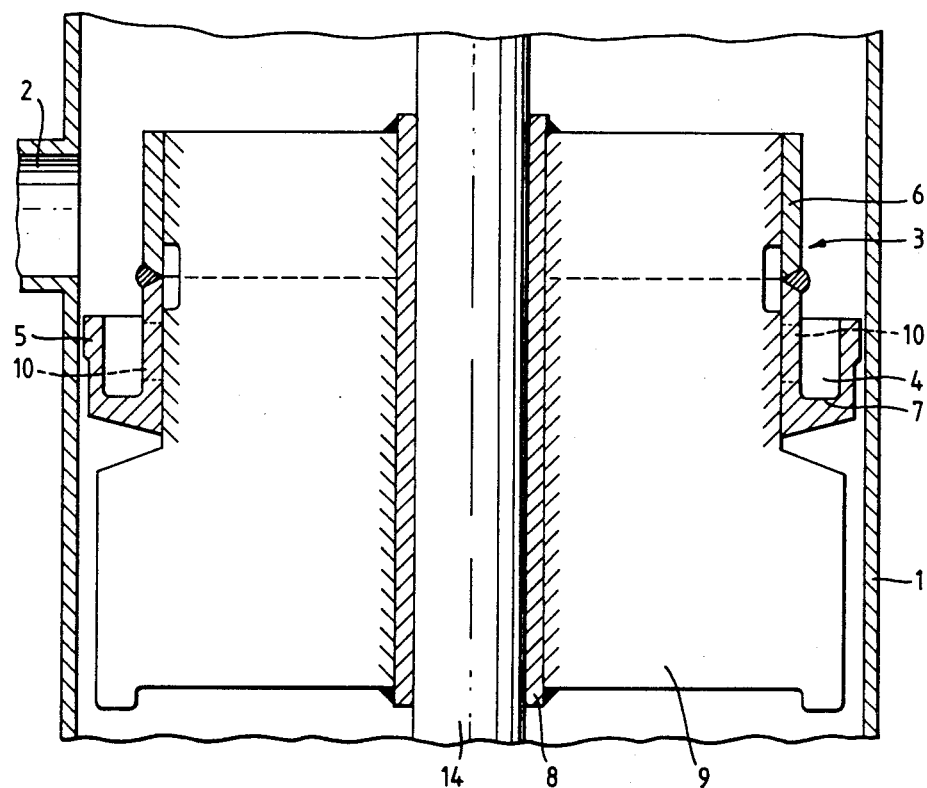
FIG. 1 is a diagrammatic representation of an embodiment of a distributor located within a solvent extraction column.
Figure 2:
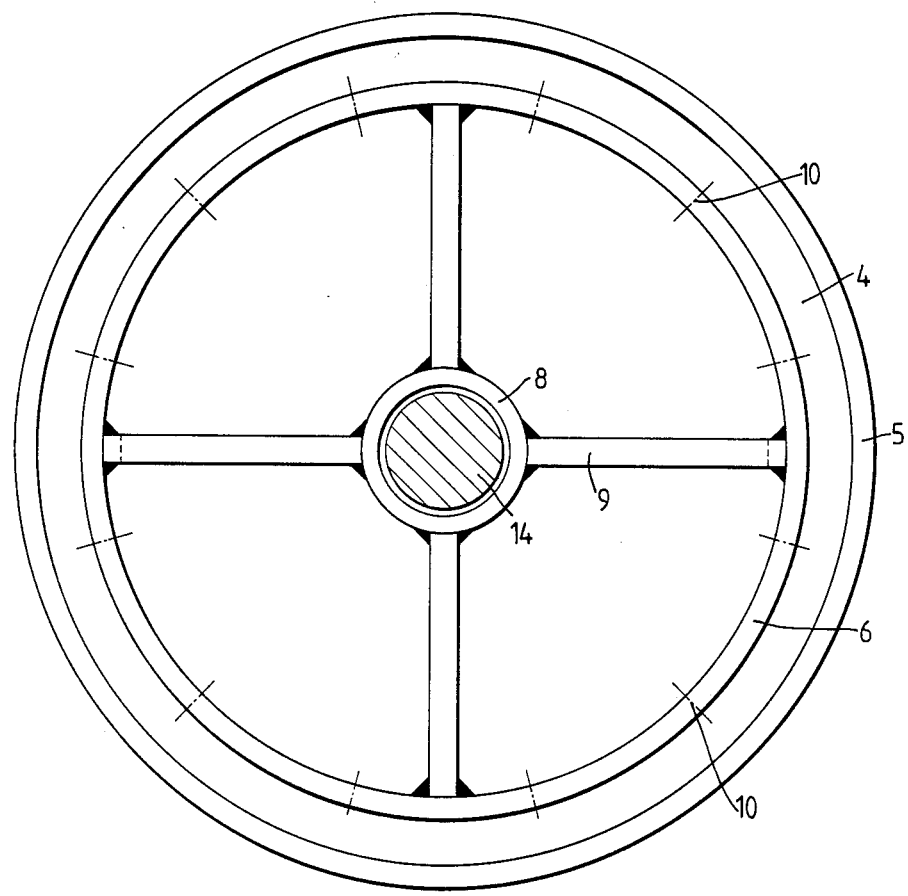
FIG. 2 is a plan of the distributor.

FIG. 1 shows a portion of a solvent extraction column 1 having an inlet port 2. For use of the column in the solvent continuous mode already mentioned, the inlet port 2 is located at or near the upper end of the column to receive an aqueous feed supply. A distributor 3 dimensioned to fit within the column is located at a position substantially as shown in FIG. 1. A central tie rod 14 supports the distributor 3 and other component parts of the column.

The distributor 3 comprises an endless open channel 4 having outer and inner side walls 5 and 6 respectively and a base 7. Whereas the outer wall 5 is below the inlet port 2 the inner wall 6 is such as to extend upwardly from the trough across the mouth of the inlet port. The channel 4 is mounted on a central barrel 8, which receives the tie rod 14, by means of radial plates 9.

The channel 4 is provided with a plurality of equiangularly spaced apart apertures 10. The apertures can be in the floor 7 or in the inner wall 6 or both of the channel. Conveniently the channel is provided with such apertures at an angular spacing of 30°.

In operation, the distributor is located within the column in a position substantially as shown in FIG. 1. An aqueous inlet flow at the port 2 enters the column to fall into the channel 4, the high inner wall 6 serving as a barrier to prevent overshoot of the flow. The aqueous flow in the channel exits through the spaced apart apertures 10 to meet the solvent phase rising through the column. The distributor thus serves to distribute the aqueous flow over the extent of the column and the aqueous flow is not confined to that region of the column in the vicinity of the inlet as would be the case in the absence of the distributor.

In a modification, not illustrated, the radial spacer plates 9 can be replaced by radial troughs which communicate with the annular channel 4, the radial troughs likewise having apertures therein whereby to enhance the distribution of the incoming aqueous flow over the extent of the column.

The above concerns the distribution of an incoming aqueous flow which enters at or near the top of the column to meet and fall through a less dense solvent phase rising up the column. The distributor is equally applicable to the distribution of an incoming solvent flow introduced at a port at or near the bottom of the column to rise through an aqueous phase falling through the column. In this application the distributor is inverted and arranged such that the channel 4 is located adjacent to but above the solvent inlet port with the inner wall 6 extending downwards across the mouth of the inlet port. The incoming solvent feed is diverted by the wall 6 to rise into the channel 4 from which it is distributed over the extent of the column through the apertures 10 in the channel.

I claim:

1. A solvent extraction column including a distributor for receiving feed liquid introduced into the column through an inlet port in which the distributor comprises an endless axially open channel having inner and outer side walls and dimensioned to fit with radial clearance within the column at a position adjacent to and axially offset with respect to the inlet port, a plurality of angularly spaced apart apertures in the channel for distributing liquid entering the channel from the inlet port over the extent of the column, the inner side wall of the channel extending across the inlet port to direct incoming flow at the inlet port into the channel.

2. A solvent extraction column according to claim 1 in which the apertures are formed in the inner wall.

3. A solvent extraction column according to claim 1 in which the apertures are formed in the base of the channel.

4. A solvent extraction column according to claim 1 in which the channel is located at a position below the inlet port.

5. A solvent extraction column according to claim 1 including a central tie rod and means for supporting the channel on the tie rod.

6. A solvent extraction column according to claim 5 in which the support means comprises radial webs.

7. A solvent extraction column including a liquid inlet port in the column side wall, and a distributor for receiving feed liquid introduced into the column through said inlet port, said distributor comprising an endless axially open channel having radially inner and outer axially extending side walls and dimensioned to fit with clearance within the column at a position adjacent to the inlet port, the outer side wall being radially spaced from the column side wall and axially clear of the inlet port, the inner side wall of the channel axially overlapping and extending across the inlet port to direct incoming flow from the inlet port into the channel, a plurality of angularly spaced apart apertures in the channel for distributing liquid entering the channel from the inlet port over the extent of the column, the apertures being axially offset toward the base of the channel from the axially outer free edge of the outer side wall, and a central tie rod extending axially in the column for supporting said distributor.

8. A solvent extraction column as claimed in claim 7 in which the feed liquid from the inlet port is of a density so as to flow in a predetermined axial direction after entering the column generally transversely, and the base of said channel and the free edge of said wall are adjacent but axially displaced from the inlet port in said predetermined direction such that the channel is open axially oppositely to said predetermined direction, the free edge of said inner wall extending from the channel base axially oppositely to said predetermined direction to a level beyond said inlet port.

* * * * *